Figure 1:
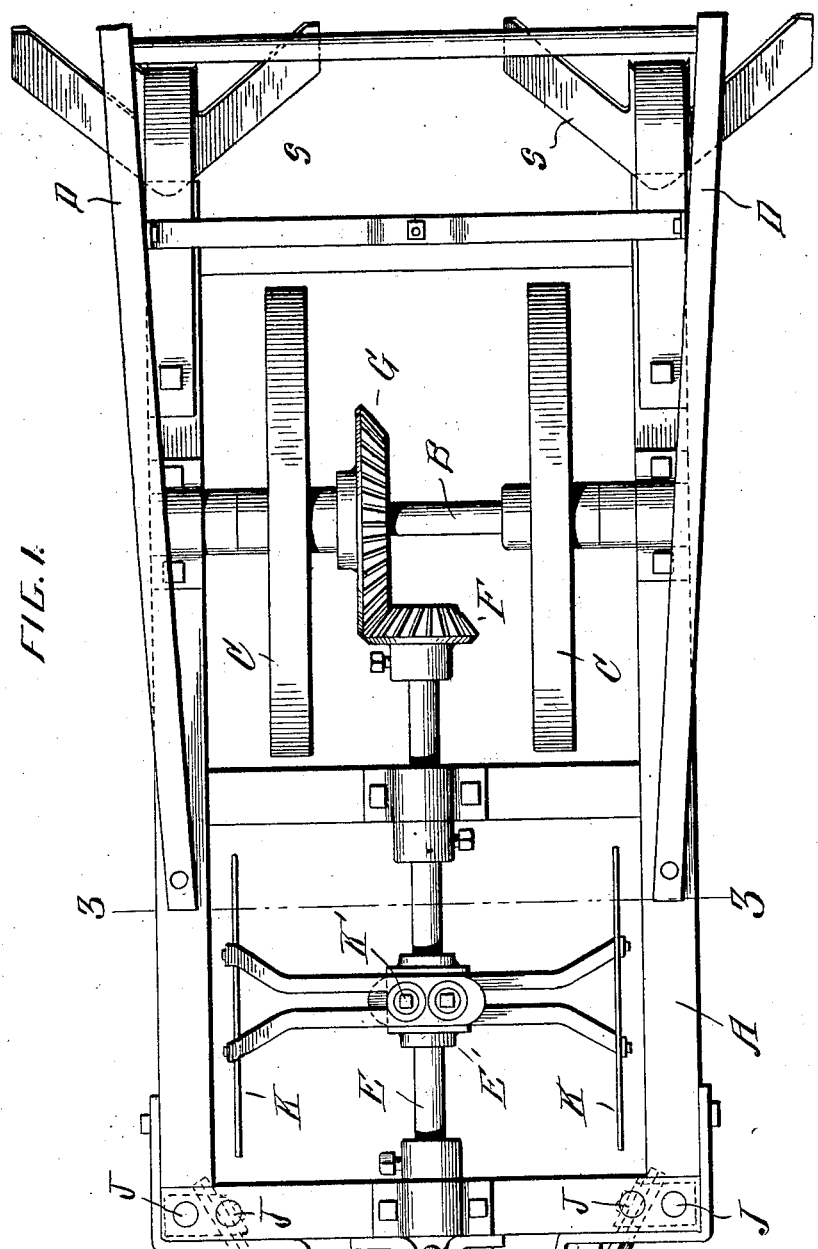

No. 882,335. PATENTED MAR. 17, 1908.
W. D. McCLURE.
COTTON CHOPPER.
APPLICATION FILED DEC. 5, 1907.

2 SHEETS—SHEET 1.

WITNESSES

INVENTOR
William D. McClure
By Franklin N. Hough
Attorney

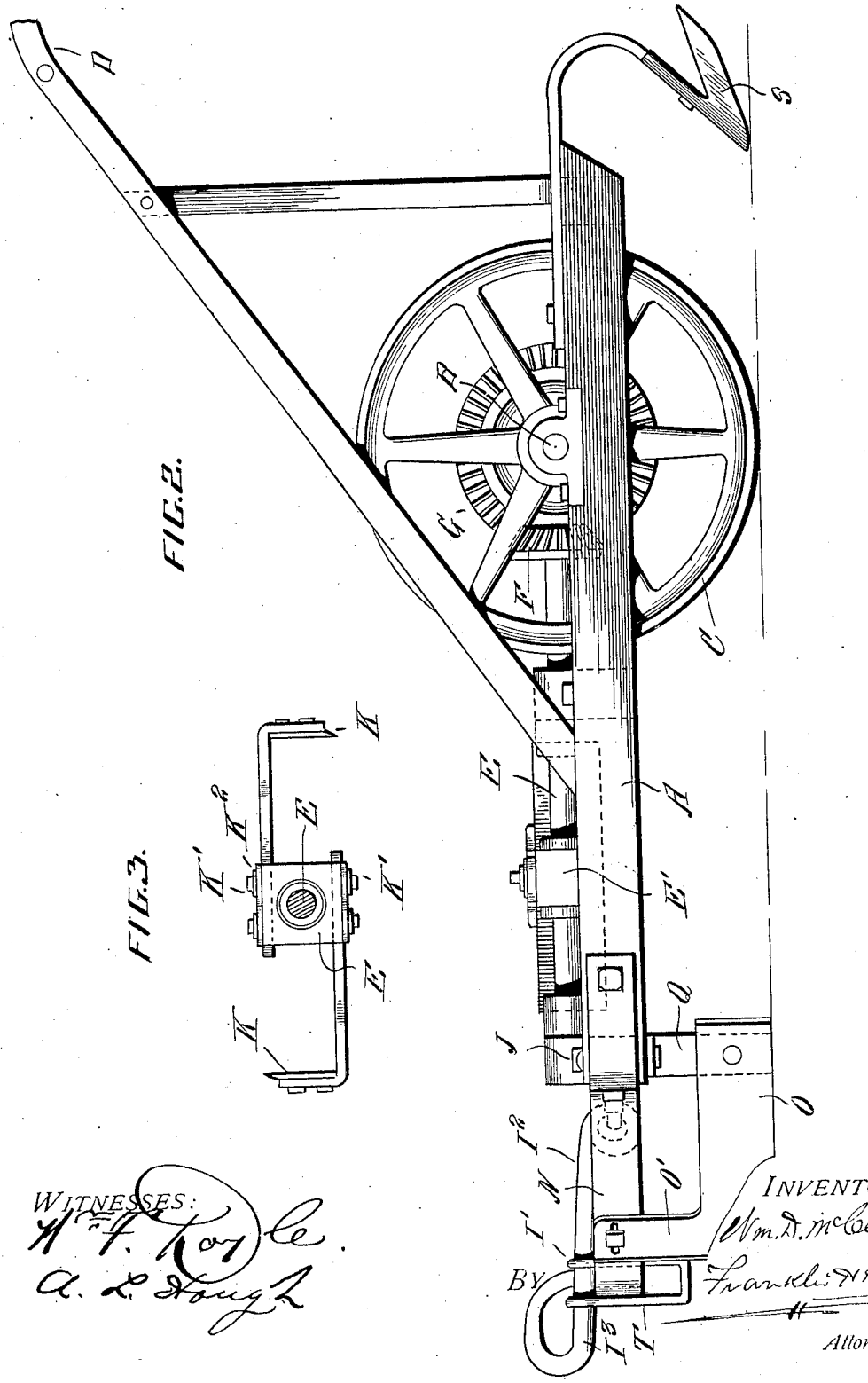

UNITED STATES PATENT OFFICE.

WILLIAM D. McCLURE, OF KIRKSEY, SOUTH CAROLINA, ASSIGNOR OF ONE-HALF TO WILLIAM A. STROM, OF PLEASANT LANE, SOUTH CAROLINA.

COTTON-CHOPPER.

No. 882,335.  Specification of Letters Patent.  Patented March 17, 1908.

Application filed December 5, 1907. Serial No. 405,220.

*To all whom it may concern:*

Be it known that I, WILLIAM D. McCLURE, a citizen of the United States, residing at Kirksey, in the county of Greenwood and State of South Carolina, have invented certain new and useful Improvements in Cotton-Choppers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cotton choppers and the object of the invention is to produce a simple and efficient apparatus of this nature so constructed that the chopping blades may be given a certain number of revolutions to each revolution of the driving wheel, sufficient to cause preferably one inch of space to escape the action of the blades in a foot, this being accomplished by the proper gearing of the apparatus.

More specifically, the invention comprises a cotton chopper consisting of a frame having two driving wheels spaced apart adapted to receive the weight of the apparatus and in the provision of a rotatable shaft geared to the main shaft and provided with adjustable chopping blades and in the provision of a bracket, the extension upon the frame upon which are mounted plows or scrapers adapted to cut away the opposite sides of the hill or row and in the provision of draft means whereby a horse attached to the apparatus may turn to one side or the other where the row curves and, at the same time, cause a direct central draft upon the apparatus.

The invention comprises various details of construction and combinations and arrangements of parts which will be hereinafter fully described and then specifically defined in the appended claims.

I illustrate my invention in the accompanying drawings, in which:—

Figure 1 is a top plan view of the apparatus, Fig. 2 is a side elevation, and Fig. 3 is a section on line 3—3 of Fig. 1.

Reference now being had to the details of the drawings by letter, A designates the frame of the apparatus which may be made of any suitable material and B is a driving shaft journaled in suitable bearings thereon. C—C designates two driving wheels which are spaced apart and fixed to said shaft and upon which the weight of the apparatus rests.

D designates suitable handles upon the frame and E is a longitudinally disposed shaft journaled in bearings upon the frame and provided with a beveled gear F at one end which is in mesh with a similar gear wheel G fixed to the driving shaft B.

E' designates a block upon the shaft E and to the opposite faces thereof are adjustably held the chopper blades K, which blades may be of any desired length and the shanks thereof are provided with elongated slots through which the bolts K' carried by said block pass, suitable nuts K² being mounted upon the threaded ends of the bolts in order to hold the chopper blades in adjusted positions.

Fixed to the forward end of the frame is a bracket iron or bar, N, preferably of the shape shown in the drawings, and O—O designate two plow or scraper blades fastened at their forward ends at O' to said bracket member N and the rear end of which is provided with an apertured lug Q through which one or the other of the bolts J is adapted to pass. It will be noted that the rear end of each plow O may be held on one or the other of the two bolts, accordingly as it may be desired to cause the plows to cut a wide or narrow furrow.

I designates a draw bar which is fastened to the forward end of the frame and has a loop I' formed therein to which a bar I² is connected, said draw bar having a hook I³ at its free end.

T designates a clevis having eyes T' at its end engaging over the shank of said draw bar and positioned one upon each side of the outer end of the bracket N and serving to allow the draw bar I to have a slight vertical movement as well as a swinging lateral movement.

The rear end of the frame is provided with the wing plows S which are vertically adjustable and provided for the purpose of covering up the tender plants which remain undisturbed by the chopper blades.

The operation of my apparatus will be readily understood and is as follows:—The wheels B and the gearing mechanism is so arranged that a certain number of revolutions will be imparted to the shaft E carrying the chopper blades at each revolution of the wheels C, whereby a certain space will be cut intermediate the cotton plants desired to be left growing in a row. As the apparatus is drawn over the ground, the plows O will cut away the sides of the earth and the rotatable blades of the chopper will cut away the superfluous plants and the covering plows following behind will throw the loose dirt about the plants that remain standing, thereby strengthening the same and preventing their wilting. In the event of the rows being curved, the horse or other animal attached to the apparatus pulling upon the draw bar may move laterally and still have the line of draft central. In practice, I prefer to have the driving and the gear wheels of proportionate diameters and the chopping blades of such length as will cause a group of plants to remain standing at about eleven or twelve inches apart, the intervening plants being cut by the blades.

What I claim to be new is:—

In combination with the frame of a cotton chopper, an extension bracket bar secured to the end of the frame, a draw bar fastened to the frame intermediate the arms of said bracket bar, a clevis straddling the draw bar and having an eye in each of its ends to receive the draw bar, the latter designed to rest upon the upper edge of the bracket bars, and its upper throw limited by said clevis, as shown and described.

In testimony whereof I hereunto affix my signature in the presence of two witnesses.

WILLIAM D. McCLURE.

Witnesses:
   A. L. HOUGH,
   FRANKLIN H. HOUGH.